(12) United States Patent
Kipnis et al.

(10) Patent No.: US 9,264,406 B2
(45) Date of Patent: Feb. 16, 2016

(54) PUBLIC KEY CRYPTOGRAPHY WITH REDUCED COMPUTATIONAL LOAD

(75) Inventors: Aviad Kipnis, Efrat (IL); Eliphaz Hibshoosh, Tel Aviv (IL)

(73) Assignee: Cisco Technology Inc., San Jose, CA (US)

( * ) Notice: Subject to any disclaimer, the term of this patent is extended or adjusted under 35 U.S.C. 154(b) by 263 days.

(21) Appl. No.: 14/001,541

(22) PCT Filed: Jun. 10, 2012

(86) PCT No.: PCT/IB2012/052930
§ 371 (c)(1),
(2), (4) Date: Aug. 26, 2013

(87) PCT Pub. No.: WO2012/172469
PCT Pub. Date: Dec. 20, 2012

(65) Prior Publication Data
US 2013/0329886 A1  Dec. 12, 2013

(30) Foreign Application Priority Data

Jun. 12, 2011 (IL) .......................................... 213497
Dec. 7, 2011 (IL) .......................................... 216806

(51) Int. Cl.
*H04L 29/06* (2006.01)
*H04L 9/30* (2006.01)

(52) U.S. Cl.
CPC .............. *H04L 63/0428* (2013.01); *H04L 9/30* (2013.01)

(58) Field of Classification Search
CPC ... H04L 63/0428; H04L 2209/24; H04L 9/28; H04L 9/08; H04W 12/04
See application file for complete search history.

(56) References Cited

U.S. PATENT DOCUMENTS

| 5,295,188 | A | 3/1994 | Wilson et al. |
| 6,535,607 | B1 | 3/2003 | Chandersekaran et al. |
| 7,120,249 | B2 * | 10/2006 | Roberts ........................... 380/44 |
| 7,352,867 | B2 | 4/2008 | Medvinsky |

(Continued)

FOREIGN PATENT DOCUMENTS

| JP | 7087081 | 3/1995 |
| WO | WO 2004/114587 A1 | 12/2004 |

OTHER PUBLICATIONS

Dec. 3, 2012 Transmittal of International Search Report and Written Opinion of the International Searching Authority for PCT/IB2012/052930.

(Continued)

*Primary Examiner* — Fatoumata Traore
(74) *Attorney, Agent, or Firm* — Hahn Loeser & Parks, LLP

(57) ABSTRACT

A cryptographic method, comprising receiving a public key belonging to a message recipient having a private key corresponding to the public key, selecting a numerical seed, having a first entropy, using the numerical seed and the public key, generating key recovery information having a second entropy, which is less than the first entropy, and generating a message key having a third entropy, which is less than the first entropy, encrypting a message using the message key, and transmitting the encrypted message and the key recovery information to the message recipient, whereby the recipient reconstructs the message key using the key recovery information and the private key and decrypts the encrypted message using the reconstructed message key. Related systems and methods are also included.

22 Claims, 3 Drawing Sheets

(56) References Cited

U.S. PATENT DOCUMENTS

| | | | |
|---|---|---|---|
| 7,970,135 B1 | 6/2011 | Schwenk | |
| 8,386,800 B2* | 2/2013 | Kocher et al. | 713/189 |
| 8,429,408 B2* | 4/2013 | Vanstone | 713/171 |
| 2009/0019282 A1 | 1/2009 | Arditti et al. | |
| 2009/0245516 A1 | 10/2009 | Ravikiran | |
| 2010/0287383 A1* | 11/2010 | Conte et al. | 713/189 |
| 2010/0290627 A1 | 11/2010 | Tsuji et al. | |
| 2011/0107105 A1 | 5/2011 | Hada | |
| 2011/0161670 A1* | 6/2011 | Chase et al. | 713/171 |
| 2011/0179274 A1* | 7/2011 | Veugen et al. | 713/169 |

OTHER PUBLICATIONS

Ernest F. Brickell, "Breaking Iterated Knapsacks" *Advances in Cryptology-Crypto '84*, pp. 342-358 (Springer-Verlag 1998).

Jintai Ding, "A New Variant of the Matsumoto-Imai Cryptosystem Through Perturbation," *PKC 2004, LNCS 2947*, pp. 305-318 (International Association for Cryptologic Research, 2004).

Eiichiro Fujisaki et al., "Secure Integration of Asymmetric and Symmetric Encryption Schemes" *CRYPTO' 99, LNCS 1666*, pp. 537-554 (Springer-Verlag 1999).

Min-Shiang Hwang et al., "A New Knapsack Public-Key Cryptosystem Based on Permutation Combination Algorithm," *Int'l Journal of Mathematical and Computer Sciences* 5:1, pp. 33-38 (2009).

J.C. Lagarias, "Knapsack Public Key Cryptosystems and Diophantine Approximation" (AT&T Bell Laboratories).

A. Menezes et al., "Key Establishment Protocols," *Handbook of Applied Cryptography*: Chapter 12, pp. 489-541 (CRC Press 1997).

A. Menezes et al., "Public Key Encryption," *Handbook of Applied Cryptography*: Chapter 8, pp. 283-319 (CRC Press 1997).

Phong Q. Nguyen et al., "Adapting Density Attacks to Low-Weight Knapsacks" (2005).

Ray A. Perlner et al., "Quantum Resistant Public Key Cryptography: A Survey," *Proceedings of the 8th Symposium on Identity and Trust on the Internet (IDTrust 09)*, pp. 85-93 (Apr. 16, 2009).

Jennifer Seberry et al., "Crypto Topics and Applications I," *Algorithms and theory of computation handbook (2 ed.)*, Chapter 12.

K. Nivethaa Shree, "Knapsack-Based Elliptic Curve Cryptography Using Stern Series for Digital Signature Authentication," (Abstract), *Electrical and Computer Technology (ICETECT)*, 2011 *Int'l Conference on*, pp. 1107-1110 (Mar. 24, 2011).

Mark Stamp, "Public Key Systems," *Applied Cryptoanalysis*, Chapter 6, pp. 265-314 (Wiley Interscience, 2007).

Baocang Wang et al., "Cryptanalysis of a Knapsack Public Key Cryptosystem," *Information Assurance and Security, 2009. IAS 09. Fifth Int'l Conference on*, pp. 49-52 (Aug. 20, 2009).

Baocang Wang et al., "Fast Public-Key Encryption Scheme Based on the Chinese Remainder Theorem" *Front. Electr. Electron. Eng. China 2009*, 4 (2), pp. 181-185 (Springer-Verlag 2009).

Baocang Wang et al., "A Knapsack-Based Probabilistic Encryption Scheme," *Inf. Sci.* 177, pp. 3981-3994 (Mar. 2007).

Baocang Wang et al., "A Novel Combinatorial Public Key Cryptosystem," *Informatica*, vol. 21, No. 4, pp. 611-626 (Dec. 2010).

Baocang Wang et al., "Quadratic Compact Knapsack Public-Key Cryptosystem," *Comput.Math.Appl.* 59, pp. 194-206, (Jan. 2010).

Amr M. Youssef, "Cryptanalysis of a Quadratic Knapsack Cryptosystem," *Comput.Math. Appl.* 61, pp. 1261-1265 (Feb. 2011).

Weidong Zhang et al., "A New Knapsack Public-Key Cryptosystem," *Information Assurance and Security, 2009. IAS 09. Fifth Int'l Conf. on*, pp. 53-56 (Aug. 20, 2009).

"Elgamal Encryption" (Wikipedia, Dec. 21, 2011).

"Merkle-Hellman Knapsack Cryptosystem" (Wikipedia Jan. 15, 2012).

\* cited by examiner

PUBLIC KEY CRYPTOGRAPHY WITH REDUCED COMPUTATIONAL LOAD

RELATED APPLICATION INFORMATION

The present application is a 35 USC §371 application of PCT/IB2012/052930, filed on 10 Jun. 2012 and entitled "Public key cryptography with reduced computational load", which was published on 20 Dec. 2012 in the English language with International Publication Number WO 2012/172469 and which relies for priority on IL Patent Applications 213497 and 216806, filed 12 Jun. 2011 and 7 Dec. 2011, respectively.

FIELD OF THE INVENTION

The present invention relates generally to cryptography, and particularly to systems and methods for secure exchange of cryptographic keys.

BACKGROUND

Public-key cryptographic techniques are widely used for encryption and authentication of electronic documents. Such techniques use a mathematically-related key pair: a secret private key and a freely-distributed public key. A sender encrypts a message using the recipient's public key. The recipient then decrypts the message using the corresponding private key. In a well-designed scheme, it is computationally infeasible to reconstruct the private key from the public key or to otherwise decrypt the message without having possession of the private key.

Commonly-used public-key cryptographic techniques, such as the Rivest Shamir Adleman (RSA) algorithm, rely on numerical computations over large finite fields. To ensure security against cryptanalysis, these techniques require the use of large keys and complex computations, which are costly, in terms of memory and computing power, to store and compute. These demands can be problematic in application environments such as smart cards, in which computing resources are limited.

Various alternative public-key signature schemes have been developed in order to reduce the resource burden associated with cryptographic operations. Some schemes of this sort are based on the Merkle-Hellman knapsack cryptosystem, which was first described by Merkle and Hellman in "Hiding Information and Signatures in Trapdoor Knapsacks," *IEEE Transactions on Information Theory* 24:5, pages 525-530 (1978). Unfortunately, knapsack-based schemes, including those based on more secure iterated-knapsack approaches that were developed subsequently, have been found to be vulnerable to attacks based on lattice reduction and the Diophantine approximation. Such vulnerabilities are reviewed, for example, by Brickell in "Breaking Iterated Knapsacks," *Advances in Cryptology—Crypto '84*, pages 342-358 (Springer-Verlag, 1985).

SUMMARY

Embodiments of the present invention that are described hereinbelow provide methods and systems for public key cryptography that can be implemented at relatively low computational cost but are secure against known attacks.

There is therefore provided, in accordance with an embodiment of the present invention, a cryptographic method, which includes receiving a public key belonging to a message recipient having a private key corresponding to the public key. A numerical seed, having a first entropy, is selected. Using the numerical seed and the public key, key recovery information is generated, having a second entropy, which is less than the first entropy, and a message key is generated, having a third entropy, which is less than the first entropy. A message is encrypted using the message key. The encrypted message and the key recovery information are transmitted to the message recipient, whereby the recipient reconstructs the message key using the key recovery information and the private key and decrypts the encrypted message using the reconstructed message key.

In the disclosed embodiments, generating the key recovery information and generating the message key include performing linear algebraic operations. Typically, the key recovery information and the message key are generated and the message key is reconstructed without performing exponentiation.

In some embodiments, the numerical seed includes a set of integer values, the public key includes a matrix of first integer entries and a vector of second integer entries, and generating the message key includes multiplying the integer values by the vector, and generating the key recovery information includes multiplying the integer values by the matrix. The method may include generating the public key by iteratively performing modulo operations and multiplications using elements of the private key.

Additionally or alternatively, the method includes reconstructing the message key using linear algebraic operations. Reconstructing the message key may include iteratively performing modulo operations and multiplications using the key recovery information and elements of the private key.

Alternatively, the public key is derived from a first set of hidden linear variables, including vectors in a finite field, and a set of error vectors in the finite field, and generating the key recovery information includes computing a key recovery vector and an error correcting code using the public key. The method may include reconstructing the message key using the private key, while performing an error correction computation using the error correcting code.

Typically, encrypting the message includes applying a symmetric cipher to the message using the message key.

In a disclosed embodiment, the third entropy is less than the second entropy.

In one embodiment, generating the key recovery information and the message key includes generating first key recovery information and a first message key. Encrypting the message includes receiving second key recovery information from the message recipient, reconstructing a second message key using the second key recovery information, and encrypting the message using the first and second message keys together.

There is also provided, in accordance with an embodiment of the present invention, a cryptographic method, which includes holding a private key at a message recipient, while a public key corresponding to the private key is provided to a sender. Key recovery information, computed by the sender using the public key and a selected numerical seed, is received from the sender. The numerical seed is not transmitted to the message recipient and has a first entropy, while the key recovery information has a second entropy, which is less than the first entropy. A message, which is encrypted using a message key computed by the sender using the integer values and the public key, is received from the sender, wherein the message key is not transmitted to the message recipient and has a third entropy, which is less than the first entropy. The message key is reconstructed at the message recipient using the key recovery information and the private key. The encrypted message is decrypted using the reconstructed message key.

Typically, reconstructing the message key includes applying linear algebraic operations to the key recovery information using elements of the private key, without performing exponentiation.

In one embodiment, reconstructing the message key includes iteratively performing modulo operations and multiplications using the key recovery information and the elements of the private key.

In another embodiment, the key recovery information includes an error correcting code, and reconstructing the message key includes performing an error correction computation using the error correcting code. A key recovery information vector may be multiplied by a matrix to generate an approximate message key, to which the error correction computation is applied in order to reconstruct the message key.

There is additionally provided, in accordance with an embodiment of the present invention, cryptographic apparatus, including a memory, which is configured to hold a public key belonging to a message recipient having a private key corresponding to the public key. A processor is configured to select a numerical seed having a first entropy, to use the numerical seed and the public key in generating key recovery information having a second entropy, which is less than the first entropy, and in generating a message key having a third entropy, which is less than the first entropy, to encrypt a message using the message key, and to transmit the encrypted message and the key recovery information to the message recipient, whereby the recipient reconstructs the message key using the key recovery information and the private key and decrypts the encrypted message using the reconstructed message key.

There is further provided, in accordance with an embodiment of the present invention, cryptographic apparatus, including a memory, which is configured to hold a private key and a public key corresponding to the private key. A processor is configured to transmit the public key to a sender, and to receive from the sender key recovery information, which is computed by the sender using the public key and a numerical seed, and a message, which is encrypted using a message key computed by the sender using the integer values and the public key. The numerical seed and the message key are not transmitted by the sender, and the numerical seed has a first entropy, while the key recovery information has a second entropy, which is less than the first entropy, and the message key has a third entropy, which is less than the first entropy. The processor is configured to reconstruct the message key using the key recovery information and the private key, and to decrypt the encrypted message using the reconstructed message key.

There is moreover provided, in accordance with an embodiment of the present invention, a computer software product, including a computer-readable medium in which program instructions are stored, which instructions, when read by a processor, cause the processor to receive a public key belonging to a message recipient having a private key corresponding to the public key, to select a numerical seed having a first entropy, to use the numerical seed and the public key in generating key recovery information having a second entropy, which is less than the first entropy, and in generating a message key having a third entropy, which is less than the first entropy, to encrypt a message using the message key, and to transmit the encrypted message and the key recovery information to the message recipient, whereby the recipient reconstructs the message key using the key recovery information and the private key and decrypts the encrypted message using the reconstructed message key.

There is furthermore provided, in accordance with an embodiment of the present invention, a computer software product, including a computer-readable medium in which program instructions are stored, which instructions, when read by a processor, cause the processor to access a memory holding a private key and a public key corresponding to the private key, to receive from a sender key recovery information, which is computed by the sender using the public key and a numerical seed, and a message, which is encrypted using a message key computed by the sender using the integer values and the public key. The numerical seed and the message key are not transmitted by the sender, and the numerical seed has a first entropy, while the key recovery information has a second entropy, which is less than the first entropy, and the message key has a third entropy, which is less than the first entropy. The instructions cause the processor to reconstruct the message key using the key recovery information and the private key, and to decrypt the encrypted message using the reconstructed message key.

The present invention will be more fully understood from the following detailed description of the embodiments thereof, taken together with the drawings in which:

DETAILED DESCRIPTION OF EMBODIMENTS

Overview

Figure 1:
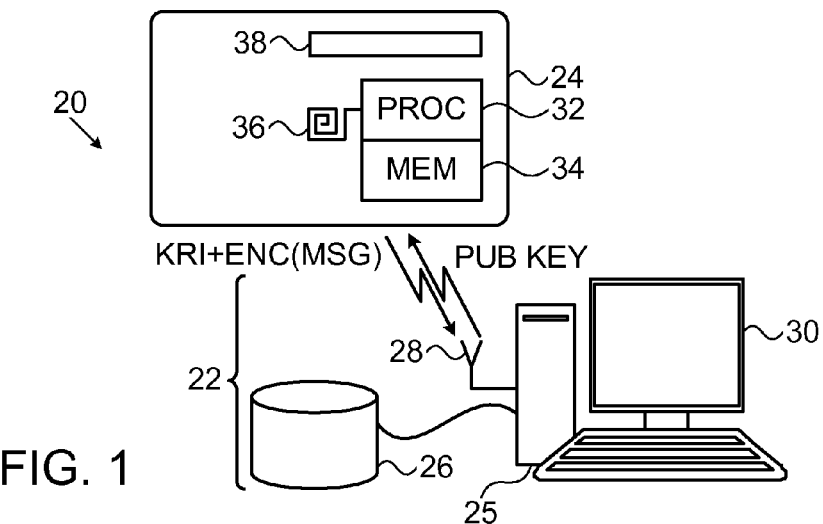
FIG. 1 is a schematic, pictorial illustration of a cryptographic system, in accordance with an embodiment of the present invention.

Public key cryptographic methods that are in common use, such as RSA, typically require the encrypting and decrypting processors to perform multiple exponentiation operations over large bases and exponents. This sort of mathematical approach offers high security but requires substantial computational power to implement (since even a single exponentiation of this sort is difficult). Such methods may therefore be impractical for implementation in low-cost and power-limited devices, such as smart cards and radio frequency identification (RFID) tags.

Embodiments of the present invention that are described hereinbelow provide methods for public key cryptography that can be implemented using only linear algebraic operations (i.e., multiplication and addition), without performing exponentiation. These methods are therefore suitable particularly for use in low-cost and power-limited devices. Some of these embodiments apply computational methods similar to those used in iterated knapsack cryptography, but with novel enhancements that provide resistance against known attacks while maintaining a low computational load. These embodiments can thus make public key cryptography practical even for low-performance devices.

In the disclosed embodiments, a message originator (also referred to as the "sender") receives a public key belonging to the intended message recipient. The recipient maintains a secret private key, from which the public key is derived. To encrypt the message, the sender selects a secret numerical seed (which can be a string of bits or a set of integer values, for example), which may be chosen at random. The sender uses the seed value together with the recipient's public key to generate a message key and also to generate key recovery information. The sender encrypts the message using the message key, by means of a symmetric encryption algorithm (also referred to as a symmetric cipher). Any suitable symmetric cryptographic algorithm, such as Advanced Encryption Standard (AES) encryption, may be used for this purpose, and the choice of this algorithm is beyond the scope of the present invention.

The sender transmits the encrypted message and the key recovery information to the recipient. The recipient reconstructs the message key using the key recovery information and the recipient's own private key. The recipient is then able to decrypt the encrypted message using the reconstructed message key with the same symmetric cryptographic algorithm that was used for encryption.

Methods that can be used to derive the public key from the private key, and then to generate the message key and key recovery information using the public key, are described in detail hereinbelow. The security of the cryptographic scheme that is based on these methods stems, at least in part, from the manner in which the seed, the key recovery information, and the message key itself are related to one another in terms of entropy. In information theory, entropy is a measure of the uncertainty associated with a random variable. In the context of the present patent application and in the claims, the term "entropy" refers to Shannon entropy, which quantifies the expected value of the information contained in a message (which can itself be considered a specific realization of a random variable), usually in units such as bits. When the message is a random binary string, the entropy is given by the number of bits in the string.

In the disclosed embodiments, the seed has greater entropy than the key recovery information, which in turn has greater entropy than the message key. As a result, an attacker cannot practically use the key recovery information to recover the seed; and the message key itself cannot practically be used to recover either the key recovery information or the seed. Therefore, the scheme is secure despite its computational simplicity.

System Description

FIG. 1 is a schematic, pictorial illustration of a cryptographic system 20, in accordance with an embodiment of the present invention. In the pictured embodiment, a server 22 exchanges secret information with a client device 24. The server in this example may be a general-purpose computer, comprising a processor 25 and a memory 26, with an interface 28 for communicating with device 24. Interface 28 is pictured as comprising a wireless antenna, but other types of wireless and/or wired links may be provided alternatively or additionally for communicating with clients. The server may also comprise a display 30 and/or other peripheral components. Typically, server 22 performs the functions that are described herein under the control of software. This software may be downloaded to the server in electronic form, over a network, for example. Alternatively or additionally, the software may be held on tangible, non-transitory computer-readable media, such as optical, magnetic, or electronic memory components.

Client device 24 in this example comprises a smart card, comprising a processor 32, a memory 34, and a communication interface 36, and possibly other components such as a display 38. As in the case of interface 28, interface 36 is shown in the figure as comprising a wireless antenna, but may alternatively comprise any other suitable sort of wireless or wired link. Processor 32 is typically programmed in software or firmware, which may be stored in memory 34, to carry out the functions that are described herein. Alternatively or additionally, processor 32 may comprise dedicated hardware logic for carrying out at least some of these functions. (In view of the computational simplicity of the cryptographic methods that are described hereinbelow, however, it is generally unnecessary that device 24 comprise dedicated cryptographic accelerator circuits, as in some devices that are known in the art.)

Upon establishing a connection with server 22, device 24 transmits its public key to the server. The corresponding private key is held securely in memory 34 and is not transmitted or otherwise disclosed outside device 24. Based on the public key and a seed, which may be chosen at random, processor 25 computes a dedicated message key and key recovery information (KRI), as described hereinbelow. The message key is held securely in memory 26 and is not transmitted or otherwise disclosed explicitly outside server 25. Server 22 applies the message key to encrypt a message for transmission to device 24, using a suitable symmetric encryption algorithm, and then transmits the encrypted message (as indicated by ENC(MSG) in the figure) and the KRI to device 24. Processor 32 uses the KRI together with the private key held in memory 34 to recover the message key, and then applies the message key in decrypting the message. Further messages may be transmitted subsequently using the same key or using a different key, which may be generated using the same public key with a new seed.

Device 24 may likewise receive a public key belonging to server 22 and may use it to generate a message key and KRI in a similar fashion. The algorithms both for generation of the message key and KRI and for key recovery are all computationally sufficiently lightweight to be carried out by processor 32. As another alternative, both server 22 and device 24 may generate respective message keys and transmit corresponding key recovery information to one another, following which messages are encrypted and decrypted using both message keys together. This sort of alternative is described in greater detail hereinbelow with reference to FIG. 5.

For the sake of clarity and convenience, embodiments of the present invention are described hereinbelow by way of example with reference to the elements of system 20. The principles of the present invention are by no means limited to this sort of system, however, and may alternatively be implemented in substantially any sort of cryptographic environment, including both client-server and peer-to-peer applications, and including substantially any and all sorts of computing and cryptographic devices.

Figure 2:
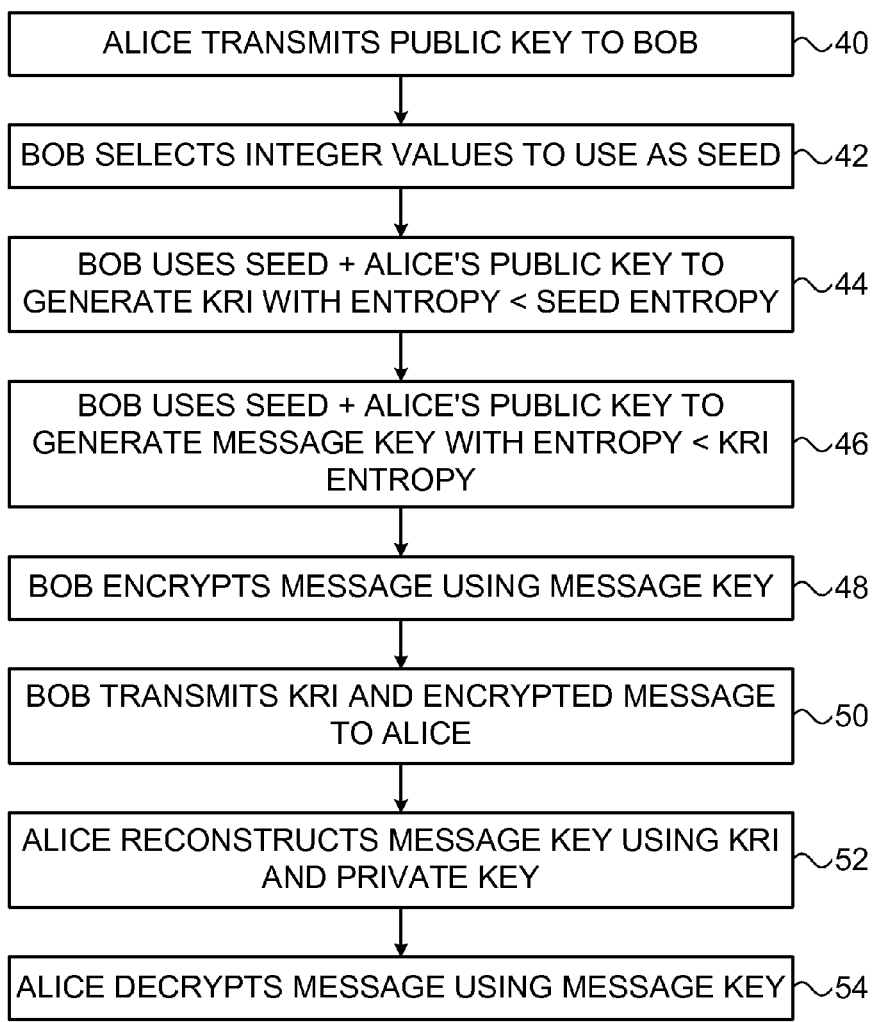
FIG. 2 is a flow chart that schematically illustrates a method for secure communication, in accordance with an embodiment of the present invention.

FIG. 2 is a flow chart that schematically illustrates a method for secure communication, in accordance with an embodiment of the present invention. The participants in the method of FIG. 2 are a pair of computing devices, which are identified, for the sake of convenience, as "Bob" and "Alice." For example, "Bob" may identify server 22, while "Alice" identifies device 24.

As an initial step (as a stage in the manufacture of device 24, for example), a private key is chosen for Alice and is stored securely in memory 34; typically, the private key is never transmitted or disclosed to any entity outside device 24. In an iterated scheme that is described in detail hereinbelow, the private key may comprise several integer vectors, which are selected at random subject to certain constraints, as described hereinbelow. The public key, which may comprise a m×n matrix and a vector of n integers, is computed from the private key in an iterative process, also described hereinbelow, and is likewise stored in memory 34. In an alternative scheme based on hidden linear variables, which is also described below, the private and public keys comprise other sorts of matrices, but the general principles of operation, as illustrated in FIG. 2, are substantially the same. Upon establishing communications with Bob, Alice transmits her public key to Bob, at a public key transmission step 40. Alternatively, Bob could receive Alice's public key from an authorized database or other authority, rather than from Alice directly. The public key is typically stored in memory 26, along with other values used by processor 24 in the course of computations.

In accordance with the iterative scheme, Bob selects a vector of n integer values to use as a seed in generating a message key and KRI, at a seed selection step 42. These integer values may be selected at random and typically have a length, in bits, that is equal to (or possibly greater than) the intended length L of the message key. (If these values have more than L bits, then the key recovery process will not result in the proper message key.)

Typically, to protect against brute-force attempts to discover the message key, $L \geq 64$. Optionally, for greater security, L may be at least 100, or possibly 128 or more. Bob applies the seed vector, together with the matrix portion of Alice's public key, in generating the KRI, at a KRI generation step 44. For example, the m×n matrix portion of the public key may be multiplied by the n-element seed vector to give a vector of m KRI elements. To ensure security of the scheme, the values of m and n are typically chosen with m<n, so that the KRI vector has fewer elements, and thus lower entropy, than the seed vector. The inventors have found it advantageous to choose m<n/2, so that the seed vector has substantially more entropy than the KRI, in order to foil attacks that are based on lattice reduction techniques, as are known in the art. In the three-iteration scheme, m may be either 1 or 2, so that the KRI contains only one or two elements, although larger values of m may also be used.

Bob uses the same seed vector, together with the vector portion of Alice's public key, to generate the message key, at a message key generation step 46. The message key may, for example, be an integer value of length L, which is computed by vector multiplication between the vector portion of the public key and the seed vector. The message key thus has lower entropy than both the seed and the KRI. Bob encrypts a message to Alice using the message key, at a message encryption step 48. As noted earlier, Bob may use any suitable symmetric cryptographic algorithm at this step, such as AES. Bob then transmits the encrypted message and the KRI computed at step 44 to Alice, at a transmission step 50.

Alice receives the message and KRI from Bob, and then uses the KRI together with elements of her private key to recover the message key, at a key recovery step 52. The key recovery computation involves iterative modular multiplications, as described in detail hereinbelow. The number of iterations (which is equal to the number of iterations used in generating the public key from the private key) is determined in advance, depending on the desired security level: Using more iterations gives greater security, but also requires larger keys and KRI and increases the transmission bandwidth required and the computational burden involved in encryption and decryption. The inventors have found that two or three iterations are sufficient for most practical applications. Typical parameters for two- and three-iteration schemes are listed below.

Alice uses the message key that was reconstructed at step 52 in decrypting the encrypted message from Bob, at a decryption step 54. At this step, Alice applies the same symmetric cryptographic algorithm that was used at step 48.

Algorithmic Details—Iterated Cryptographic Scheme

Figure 3:
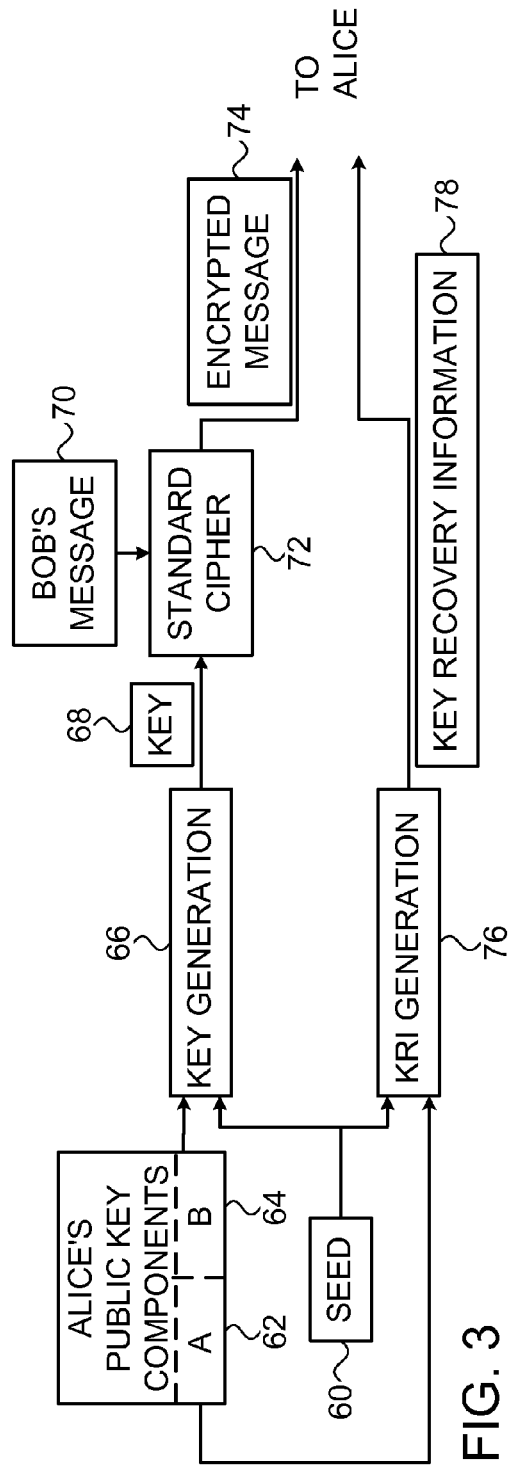
FIG. 3 is a block diagram that schematically illustrates a method for encryption of a message, in accordance with an embodiment of the present invention.

FIG. 3 is a block diagram that schematically illustrates a method for encryption of a message, in accordance with an embodiment of the present invention. This figure and the accompanying description below provide details of a possible implementation of steps 40-48 in FIG. 2. Alice's private key in a two-iteration version of this scheme has the following components:
1. $P_1, \ldots, P_m$ – m large prime numbers.
2. Elements $\alpha_1, \ldots \alpha_m$, wherein each $\alpha_i$ is an element modulo $P_i$.
3. $Q_1, \ldots, Q_m$ – m large prime numbers, such that $Q_i < P_i$, but $Q_i$ is close to $P_i$ (for example, the ten most significant bits of $Q_i$ and $P_i$ are identical).
4. Elements wherein each $\beta_3$ is an element modulo $Q_i$ satisfying:

$$2^L \mid (-\beta_i^{-1} \cdot P_i) \bmod Q_i < \frac{1}{2n} \cdot \lfloor Q_i / 2^L \rfloor$$

(meaning that the term to the right of the "|" is divisible by the term to the left, in this case $2^L$). Here and below, the inverse (-1 power) operation refers to the modular inverse (mod $Q_i$ in this case), and n is a parameter of the scheme as defined above.

In the three-iteration version the scheme, the components of the private key are as follows:
1. $P_1, \ldots, P_m, \alpha_1, \ldots \alpha_m$, and $Q_1, \ldots, Q_m$ are defined as in the two iteration scheme above.
2. Elements $\beta_1, \ldots \beta_m$, wherein each $\beta_i$ is an element modulo $Q_i$ satisfying:

$$(-\beta_i^{-1} \cdot P_i) \bmod Q_i < \frac{1}{3n} \cdot \lfloor T_i / 2^L \rfloor.$$

3. $T_1, \ldots, T_m$ – m large prime numbers, such that $T_i < Q_i$ but $T_i$ is close to $Q_i$ (for example, the ten most significant bits of $Q_i$ and $T_i$ are identical).
4. Elements $\gamma_1, \ldots \gamma_m$, wherein each $\gamma_i$ is an element modulo $T_i$ satisfying:

$$2^L \mid (\gamma_i^{-1} \cdot (-\beta_i^{-1} \cdot P_i \bmod Q_i) \bmod T_i) < \frac{1}{3n} \cdot \lfloor T_i / 2^L \rfloor$$

and $$2^L \left| (-\gamma_i^{-1} \cdot Q_i) \bmod T_i < \frac{1}{3n} \cdot \lfloor T_i / 2^L \rfloor. \right.$$

(Here the inverse (-1 power) operation on $\gamma_i$ refers to the modular inverse mod $T_i$.)

Alice's public key comprises a matrix component 62 and a vector component 64, defined as follows:

Matrix A comprises m×n integer values $a_{i,j}$ in the range [0 ... N] (wherein N is a parameter of the scheme), arranged in m rows and n columns.

Vector B comprises n integer entries $b_i$ in the range [0 ... $2^L$].

To generate the public key components from the private key, a secret matrix X of dimensions m×n is selected. In the two-iteration scheme, the elements of the i'th row of the matrix X are numbers modulo $Q_i$, and thus the values $X_{i,j}$ may be regarded as integers in the range $0 \le X_{i,j} < Q_i$. The elements $X_{i,j}$ are required to satisfy the following constraints:

$$x_{i,j} < \frac{1}{2n} \cdot \lfloor Q_i / 2^L \rfloor.$$

The public key elements $a_{i,j}$ of matrix A (component 62) are computed by iterative modular vector multiplication: $a_{i,j} = (\alpha_i \cdot (X_{i,j} \cdot \beta_i \bmod Q_i)) \bmod P_i$. The public key elements $b_j$ of vector B (component 64) are computed by summation over the elements of the matrix X: $b_j = (\Sigma_{i=1}^m X_{i,j}) \bmod 2^L$.

In the three-iteration scheme the computation of the public key components is similar, but the values $X_{i,j}$ are numbers modulo $T_i$ and can thus be regarded as intergers in the range $0 \le X_{i,j} < T_i$. The elements are required to satisfy $$x_{i,j} < \frac{1}{3n} \cdot \lfloor T_i / 2^L \rfloor.$$

The elements of matrix A are defined as: $a_{i,j} = (\alpha_i \cdot (\beta_i \cdot (X_{i,j} \cdot \gamma_i \bmod T_i) \bmod Q_i)) \bmod P_i$, while the elements of vector B are the same as in the two-iteration scheme.

Seed 60 comprises a vector of n random integer values $K_1, \ldots, K_n$ in the range $0 \le K_i < 2^L$. In key generation 66, a message key (MK) 68 is generated by vector multiplication between vector component 64 of the public key and seed 60, followed by a modulo operation: $MK = (\Sigma_{j=1}^n b_j \cdot K_j) \bmod 2^L$. Key 68 is used in a standard symmetric cipher (encryption algorithm) 72 to turn Bob's message 70 into an encrypted message 74 for transmission to Alice.

In KRI generation 76, matrix component 62 of the public key is multiplied by seed 60 to give KRI 78, comprising a vector of m integers, in which each element is given by $KRI_i = \Sigma_{j=1}^n a_{i,j} \cdot K_j$; $1 \le i \le m$.

Figure 4:
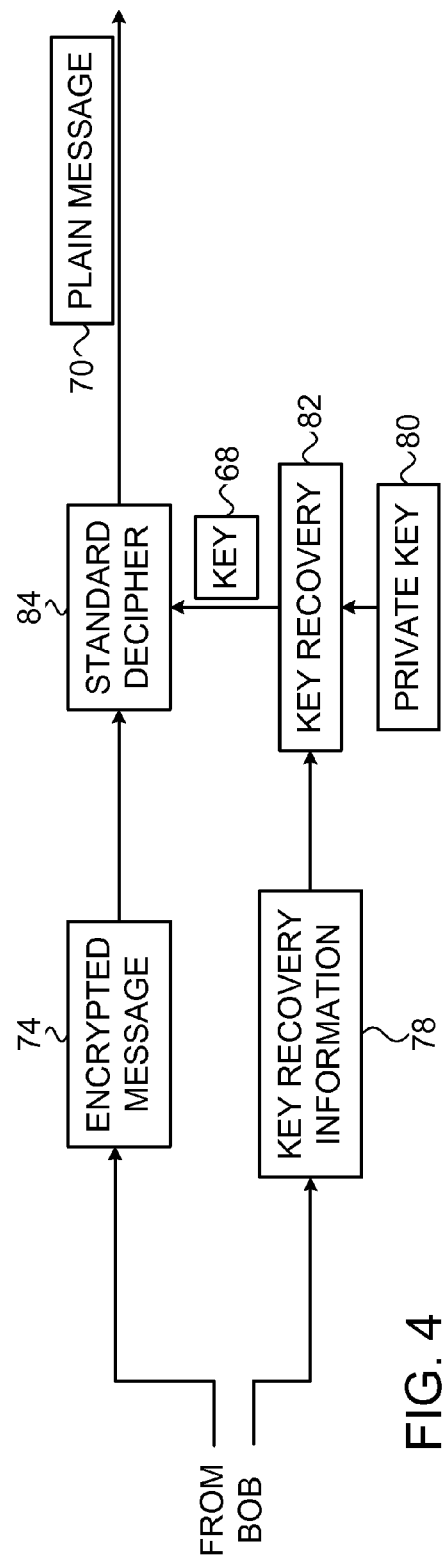
FIG. 4 is a block diagram that schematically illustrates a method for decryption of a message, in accordance with an embodiment of the present invention.

FIG. 4 is a block diagram that schematically illustrates a method for decryption of message 74, in accordance with an embodiment of the present invention. This figure and the accompanying description below provide details of a possible implementation of steps 52-54 in FIG. 2. Alice applies KRI 78 and her stored private key 80 (from memory 34) to compute the value of message key 68, in key recovery 82.

The computation here, too, involves iterative modular vector multiplications: In the two-iteration scheme Alice calculates interim vector elements $Y_i = [(\beta_i^{-1} \cdot (KRI_i \cdot \alpha_i^{-1}) \bmod P_i) \bmod Q_i] \bmod 2^L$, and then performs summation and modulo operations over these components to compute message key 68: $MK = (\Sigma_{i=1}^m Y_i) \bmod 2^L$. For the three-iteration scheme Alice calculates the vector elements $Y_i$ as follows: $Y_i = (\gamma_i^{-1} \cdot (\beta_i^{-1} \cdot (\alpha_i^{-1} \cdot KRI_i \bmod P_i) \bmod Q_i) \bmod T_i) \bmod 2^L$, and then sums the elements as in the two-iteration scheme to find key 68.

Alice applies key 68 to encrypted message 74 in a standard decipher 84, corresponding to cipher 72, and thus decrypts Bob's original message 70.

The inventors have evaluated the encryption and decryption scheme described above and found it to be correct and secure against attack. Although the present scheme uses principles that in some ways resemble "iterated knapsack" encryption schemes, it avoids the vulnerabilities inherent in the type of trapdoor that is normally used in such schemes. Rather, by appropriate choice of parameters, to give sufficient differentiation of entropy between the secret seed and private key elements—which are never transmitted—and the KRI and message key, the present scheme is highly resistant to known types of attack, including attacks based on finding simultaneous Diophantine approximations, despite the low computational complexity of the scheme.

The parameters of the encryption scheme described above can be selected based on a tradeoff between security and computational burden, which is a function of the data size and the computational complexity. As noted earlier, a message key length of L=100 bits is typically sufficient to foil brute force decryption attacks, and it will therefore be assumed that L=100. In the two-iteration scheme, it is desirable that the size N of the integer elements of matrix A, which depends on the size of the elements of the private key, be (in binary terms) at least twice the length of the message key. In other words, N is at least 200 bits long, and could reasonably be set to 400 bits, so that $\log_2(N) = 400$. In this case, it can be shown that the seed vector should have n=6 elements. With this choice of parameters, the public key size is about 3 Kbits, and the KRI size about 500 bits.

For greater security, the parameters could be chosen to be $\log_2(N) = 1000$, L=100, n=16. In this case, the public key size is about 17.6 Kbits, and the KRI is about 1.1 Kbits. The complexity of encryption and decryption in this latter case is about 4-5 times greater than using the smaller parameters from the preceding example.

In the three-iteration scheme, the parameters may be set to $\log_2(N) = 500$, L=100, n=13; or for greater security to $\log_2(N) = 1000$, L=100, n=26. The first of these sets of parameters gives a public key size of about 14.3 Kbits and KRI size of 1.2 Kbits; while the second gives a public key size of about 54.6 Kbits and KRI size of 2.2 Kbits. The complexity of encryption and decryption is about four times greater for the second parameter set than for the first and is in either case several times higher than in the two-iteration scheme.

Alternative Embodiment

Cryptographic Scheme Based on Hidden Linear Variables

The principles of the present invention that are set forth above may similarly be applied in other novel cryptographic schemes that are based on linear algebraic computations, without exponentiation. For example, in the embodiment described below, the scheme is based on a set of hidden linear variables, in the form of m vectors $y_1, y_2 \ldots y_m$ in $Z_P^n$, which are used in the construction of the public and private keys. ($Z_P$ is the field of integers modulo P, and $Z_P^n$ is the vector space of n-element vectors over $Z_P$.) The hidden linear variables may be arranged in m columns forming a n×m HLV matrix over $Z_P$.

In the present HLV-based scheme, the key recovery information (KRI) that is transmitted to the message recipient for use in reconstructing the message key comprises two components: a KRI vector $KRI_V$ and an error correcting code $KRI_{ECC}$. The public key in this scheme comprises three matrices:

B—n×r matrix of mod P numbers, which is used for generation of the message key (MK), of size r. B comprises several special linear combinations of $y_1, y_2 \ldots y_m$, as described below. "Bob" generates the message key using the matrix B and a numerical seed X, comprising a sequence of n bits, which may be chosen at random.

A—n×m matrix of mod P numbers, which is used for generation of the KRI vector $KRI_v$. A comprises m linear combinations of the vectors $y'_1, y'_2 \ldots y'_m$, wherein $y'_i = y_i + e_i$, and $\{e_i\}$ is a set of small, low-weight error vectors in $Z_P^n$. Each $e_i$ has h entries that are 1, while all the remaining entries are 0 (wherein h is small relative to n). The set of error vectors may be arranged in a n×m matrix E, in which each column i contains the corresponding vector $e_i$. We can thus write Y'=HLV+E, wherein Y' is the matrix of the perturbed variables $y'_i$.

C—r×l matrix, with elements in $Z_P$, used for generation of the error correcting code $KRI_{ECC}$, wherein l is the number of ECC equations. A possible choice of parameters that simplifies the ECC calculations is to set l=r−1, and to construct the matrix C so that only elements $C_{i,i}$ and $C_{i+1,i}$ are non-zero.

The private key comprises:

D—a at m×r secret matrix used to transform the KRI vector $KRI_v$, into an approximation MK' of the message key, which contains errors of a particular kind.

S—A set of coefficients used together with $KRI_{ECC}$ in order to correct MK' and thus recover MK.

In the HLV-based scheme, as in the iterated scheme described earlier, the seed X has greater entropy than MK and than the KRI.

To generate the public key, two secret matrices, $M_A$ and $M_{AB}$, are used, together with the:

$M_A$—a m×m mixing matrix, which is regular with random entries in $Z_P$. $M_A$ is used to generate the matrix A by mixing of the perturbed variables: $A = Y' \cdot M_A$.

$M_B$—a special m×r matrix, which is used to generate matrix B by mixing of the hidden linear variables: $B = HLV \cdot M_B$. Each column of the matrix $M_B$ contains $k = k_1 + k_2 + k_3$ non-zero elements, which are divided into three groups, each containing $k_i$ elements, wherein all the elements in each group share the same coefficient $C_i$. In each column of $M_B$ the three coefficients $c_1, c_2, c_3$ are selected independently and satisfy the criterion:

$$\min_{r \neq 0}\{\max\{|r \cdot c_1|, |n - r \cdot c_1|, |r \cdot c_2|, |n - r \cdot c_2|, |r \cdot c_3|, |n - r \cdot c_3|,\}\} > P^{2/3}$$

The private key is also generated using these two secret matrices:

D is defined as $= M_A^{-1} \cdot M_B$.

S is a list of l triplets, wherein triplet i contains the three coefficients in the ith column of $M_B$, which will be denoted $(S_{i,1}, S_{i,2}, S_{i,3})$.

After receiving Alice's public key (matrices A, B and C), Bob generates a message key (MK) for use in symmetric encryption of a message to Alice by multiplying the seed X by the matrix B: $MK = X \cdot B$. MK is thus a vector of r modulo P elements. The KRI vector has m modulo P elements, computed by Bob as $KRI_v = X \cdot A$. Bob computes $KRI_{ECC}$ as a vector of l modulo P elements, given by $KRI_{ECC} = MK \cdot C$. Bob encrypts his message using MK, and then transmits the encrypted message together with the key recovery information $KRI_v$ and $KRI_{ECC}$ to Alice.

Upon receiving the encrypted message and KRI from Bob, Alice computes $MK' = KRI_v \cdot D$ and then recovers the actual message key MK from MK' using $KRI_{ECC}$. As the basis for this computation, it can be shown that $MK' \cdot C - KRI_{ECC} = (X \cdot E \cdot M_B) \cdot C$, and that $MK' = MK + X \cdot E \cdot M_B$. Thus, Alice is able to derive MK from MK' using the known values of the matrix C and the vector $KRI_{ECC}$.

Alice may use an error correction computation to derive MK from MK'. For this purpose, it can be shown that the vector elements of $MK' \cdot C - KRI_{ECC}$ can be written as $(MK' \cdot C - KRI_{ECC})_i = \sum_{j=1}^{r}(S_{j,1} \cdot \mu_{j,1} + S_{j,2} \cdot \mu_{j,2} + S_{i,3} \cdot \mu_{j,3}) \cdot C_{j,i}$, wherein $\mu_{j,1}, \mu_{j,2}, \mu_{j,3}$ are small random variables. The correct values of these random variables for a given KRI can be found by searching through all reasonable values of $\mu_{j,1}, \mu_{j,2}, \mu_{j,3}$ (i.e., with the correct expected value and variance) over the rows i until the correct values of are found. The expected value of $\mu_{j,\alpha}$ is $$\frac{h \cdot k_\alpha}{2},$$

while the standard deviation of $\mu_{j,\alpha}$ is $$\frac{\sqrt{h \cdot k_\alpha}}{2 \cdot \sqrt{2}}.$$

In these expressions, h is the number of non-zero elements in each column of the matrix E; $k_\alpha$ is the number of elements in the $j^{th}$ column of the matrix $M_B$ all having the same coefficient $S_{j,\alpha}$; and $\alpha$ has the value 1, 2 or 3.

When the ECC matrix C is constructed as suggested above (with l=r−1 and only elements $C_{i,i}$ and $C_{i+1,i}$ non-zero), the computation is simplified, since only six of the random variables must be considered for each value of i ($\mu_{1,1}, \mu_{1,2}, \mu_{1,3}, \mu_{2,1}, \mu_{2,2}, \mu_{2,3}$ for i=1, and so forth). Thus, for l sufficiently large, only the single correct solution for the random variables will be upon completion of the ECC computation. This solution is then used in finding MK.

In embodiments of the present invention, values of the parameters n, m and r are chosen so as to ensure the security of the HLV scheme against attack. Typically, n is much larger than m+r, for example, n>4(m+r), and therefore the public key and KRI do not provide enough linear equations to recover X (i.e., the numerical seed has greater entropy than the KRI and than the message key). Typically, n≥200.

To avoid other kinds of attacks, it is desirable that m be much larger than r, for example, m>3r. Typically, m>40, and $c_1, c_2$ and $c_3$ are all of the same order. The matrix E is selected carefully to avoid small vectors in the lattice spanned by the vectors in A and in B within the n-dimensional vector space over $Z_P$.

The security of the scheme described above may be enhanced in a number of ways:

1. The scheme may be repeated several (for example, ten) times, and the actual message key is a concatenation of all the recovered keys. This approach is simple but requires ten times more bandwidth and ten times the number of computations.

2. Alternatively, the scheme may be launched only once, but with larger parameters. For example, the B matrix may have ten times more columns (10*r), and likewise the ECC matrix C (10*l). The columns may be divided into 10 groups of l columns each, wherein the first group corresponds to message key elements 1−r, the second group to elements r+1−2r, and so forth. The message key is recovered, in the manner described above, over the groups of r elements in succession. To maintain the required entropy relationships and to meet the required security level in this case, the parameters should be chosen so that m>20r.

3. As a further alternative, the message key may be recovered without an explicit error correction step. Instead, the error correction code is integrated into matrix A, which is redefined as a n×m+d matrix. The extra d columns provide the information needed to record the true values of $y_1 \ldots y_m$, as in the original scheme described above.

Authenticated Key Exchange Using Key Recovery Information

Figure 5:
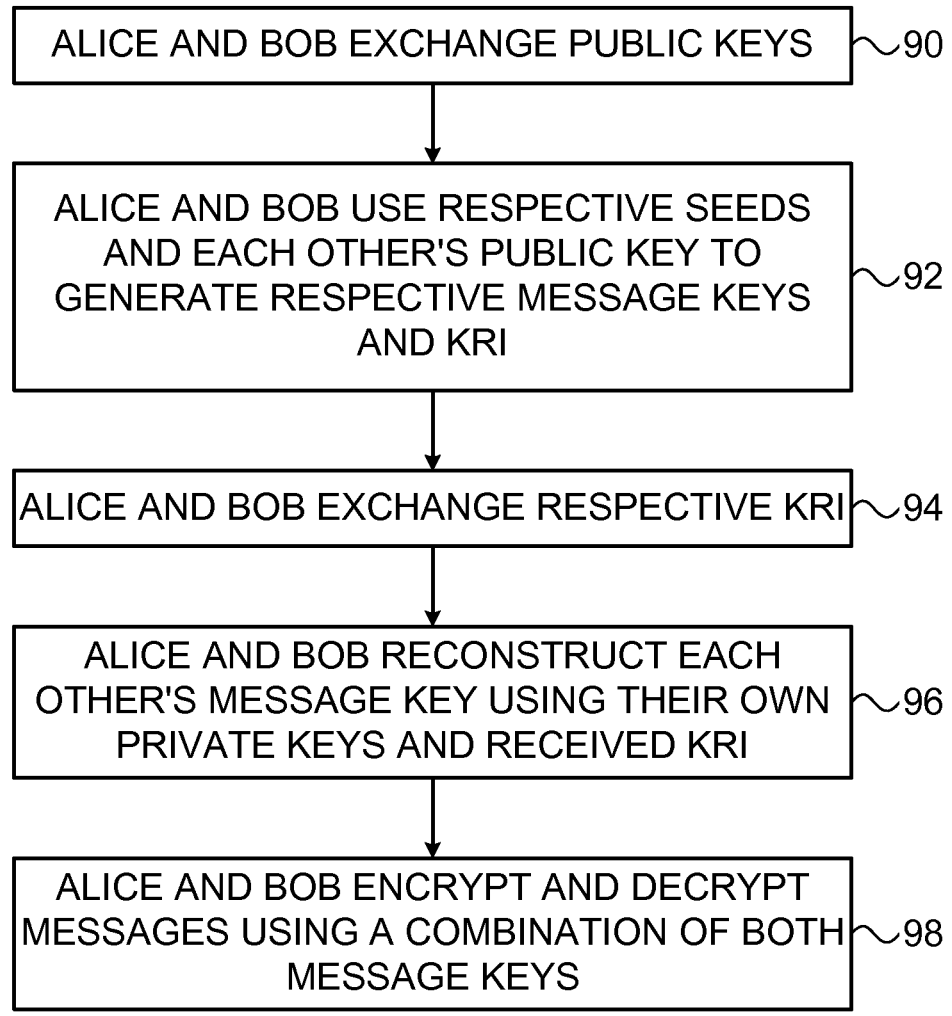
FIG. 5 is a flow chart that schematically illustrates a method for secure communication, in accordance with another embodiment of the present invention.

FIG. 5 is a flow chart that schematically illustrates a method for secure communication, in accordance with another embodiment of the present invention. This method uses an encryption scheme similar to that described above, but applies it as the basis for an authenticated key exchange between communicating parties, which are again identified as "Alice" and "Bob."

Upon establishing their communication link, Alice and Bob exchange their respective public keys, at a public key exchange step 90. (The private keys and the corresponding public keys are chosen and computed as described above.) Alice and Bob each choose a respective seed, comprising a vector of integers, which may be chosen at random. At a message key generation step, Alice uses her seed together with Bob's public key to generate her message key and KRI; and Bob similarly uses his seed with Alice's public key to generate his message key and KRI. Alice and Bob transmit their respective KRI one to the other, at a KRI exchange step 94.

Alice and Bob use the KRI that they have received together with their own private keys to compute each other's message keys, at a key recovery step 96. In other words, Alice uses her own private key together with Bob's KRI to compute Bob's message key; and Bob uses his own private key together with Alice's KRI to compute Alice's message key. Then Alice and Bob use both Alice's and Bob's message keys together in encrypting and decrypting messages that they transmit to and receive from one another, at a key combination step 98. Typically, Alice and Bob each generate a shared key by combining Alice's and Bob's message keys in a predefined manner, such as by taking a XOR or other combinatorial function of the two keys.

Other applications of the encryption and decryption schemes described above will be apparent to those skilled in the art after reading the above description and are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A cryptographic method, comprising:
   receiving a public key belonging to a message recipient having a private key corresponding to the public key;
   selecting a numerical seed, having a first entropy;
   using the numerical seed and the public key, generating key recovery information having a second entropy, which is less than the first entropy, and generating a message key having a third entropy, which is less than the first entropy, wherein: the entropy of the message key is less than the entropy of the numerical seed; and the entropy of the key recovery information is less than the entropy of the numerical seed;
   encrypting a message using the message key; and
   transmitting the encrypted message and the key recovery information to the message recipient providing a secure transfer of a cryptographic key, whereby the recipient reconstructs the message key using the key recovery information and the private key and decrypts the encrypted message using the reconstructed message key.

2. The method according to claim 1, wherein generating the key recovery information and generating the message key comprise performing linear algebraic operations.

3. The method according to claim 2, wherein the key recovery information and the message key are generated and the message key is reconstructed without performing exponentiation.

4. The method according to claim 2, wherein the numerical seed comprises a set of integer values, wherein the public key comprises a matrix of first integer entries and a vector of second integer entries, and wherein generating the message key comprises multiplying the integer values by the vector, and generating the key recovery information comprises multiplying the integer values by the matrix.

5. The method according to claim 4, and comprising generating the public key by iteratively performing modulo operations and multiplications using elements of the private key.

6. The method according to claim 2, and comprising reconstructing the message key using linear algebraic operations.

7. The method according to claim 6, wherein reconstructing the message key comprises iteratively performing modulo operations and multiplications using the key recovery information and elements of the private key.

8. The method according to claim 2, wherein the public key is derived from a set of hidden linear variables, comprising vectors in a finite field, and a set of error vectors in the finite field, and wherein generating the key recovery information comprises computing a key recovery vector and an error correcting code using the public key.

9. The method according to claim 8, and comprising reconstructing the message key using the private key, by performing an error correction computation on the message key using the error correcting code.

10. The method according to claim 1, wherein encrypting the message comprises applying a symmetric cipher to the message using the message key.

11. The method according to claim 1, wherein the third entropy is less than the second entropy.

12. The method according to claim 1, wherein generating the key recovery information and the message key comprises generating first key recovery information and a first message key, and wherein encrypting the message comprises:
    receiving second key recovery information from the message recipient;
    reconstructing a second message key using the second key recovery information; and
    encrypting the message using the first and second message keys together.

13. A cryptographic method, comprising:
    holding a private key at a message recipient, while a public key corresponding to the private key is provided to a sender;
    receiving from the sender key recovery information computed by the sender using the public key and a selected numerical seed, wherein the numerical seed is not transmitted to the message recipient and has a first entropy, while the key recovery information has a second entropy, which is less than the first entropy;

receiving from the sender a message, which is encrypted using a message key computed by the sender using the integer values and the public key, wherein the message key is not transmitted to the message recipient and has a third entropy, which is less than the first entropy, wherein: the entropy of the message key is less than the entropy of the numerical seed; and the entropy of the key recovery information is less than the entropy of the numerical seed; and reconstructing the message key at the message recipient using the key recovery information and the private key providing a secure receipt of a cryptographic key; and decrypting the encrypted message using the reconstructed message key.

14. The method according to claim 13, wherein reconstructing the message key comprises applying linear algebraic operations to the key recovery information using elements of the private key.

15. The method according to claim 14, wherein the message key is reconstructed without performing exponentiation.

16. The method according to claim 14, wherein reconstructing the message key comprises iteratively performing modulo operations and multiplications using the key recovery information and the elements of the private key.

17. The method according to claim 14, wherein the key recovery information comprises an error correcting code, and wherein reconstructing the message key comprises performing an error correction computation using the error correcting code.

18. Cryptographic apparatus, comprising:
a memory, which is configured to hold a public key belonging to a message recipient having a private key corresponding to the public key; and
a processor, which is configured to select a numerical seed having a first entropy, to use the numerical seed and the public key in generating key recovery information having a second entropy, which is less than the first entropy, and in generating a message key having a third entropy, which is less than the first entropy, to encrypt a message using the message key, and to transmit the encrypted message and the key recovery information to the message recipient providing a secure transfer of a cryptographic key, wherein: the entropy of the message key is less than the entropy of the numerical seed; and the entropy of the key recovery information is less than the entropy of the numerical seed and whereby the recipient reconstructs the message key using the key recovery information and the private key and decrypts the encrypted message using the reconstructed message key.

19. Cryptographic apparatus, comprising:
a memory, which is configured to hold a private key and a public key corresponding to the private key; and
as processor, which is configured to receive from a sender key recovery information, which is computed by the sender using the public key and a numerical seed, and a message, which is encrypted using a message key computed by the sender using the integer values and the public key,
wherein the numerical seed and the message key are not transmitted by the sender, and wherein the numerical seed has a first entropy, while the key recovery information has a second entropy, which is less than the first entropy, and the message key has a third entropy, which is less than the first entropy, and
wherein: the entropy of the message key is less than the entropy of the numerical seed; and the entropy of the key recovery information is less than the entropy of the numerical seed; and
wherein the processor is configured to reconstruct the message key using the key recovery information and the private key providing a secure receipt of a cryptographic key, and to decrypt the encrypted message using the reconstructed message key.

20. A computer software product, comprising a non-transitory computer-readable medium in which program instructions are stored, which instructions, when read by a processor, cause the processor to receive a public key belonging to a message recipient having a private key corresponding to the public key, to select a numerical seed having a first entropy, to use the numerical seed and the public key in generating key recovery information having a second entropy, which is less than the first entropy, and in generating a message key having a third entropy, which is less than the first entropy, to encrypt a message using the message key, and to transmit the encrypted message and the key recovery information to the message recipient providing a secure transfer of a cryptographic key, wherein: the entropy of the message key is less than the entropy of the numerical seed; and the entropy of the key recovery information is less than the entropy of the numerical seed and whereby the recipient reconstructs the message key using the key recovery information and the private key and decrypts the encrypted message using the reconstructed message key.

21. A computer software product, comprising a non-transitory computer-readable medium in which program instructions are stored, which instructions, when read by a processor, cause the processor to access a memory holding a private key and a public key corresponding to the private key, to receive from a sender key recovery information, which is computed by the sender using the public key and a numerical seed, and a message, which is encrypted using a message key computed by the sender using the integer values and the public key, wherein the numerical seed and the message key are not transmitted by the sender, and wherein the numerical seed has a first entropy, while the key recovery information has a second entropy, which is less than the first entropy, and the message key has a third entropy, which is less than the first entropy, and wherein: the entropy of the message key is less than the entropy of the numerical seed; and the entropy of the key recovery information is less than the entropy of the numerical seed and wherein the instructions cause the processor to reconstruct the message key using the key recovery information and the private key providing a secure receipt of a cryptographic key, and to decrypt the encrypted message using the reconstructed message key.

22. A cryptographic method, comprising:
receiving a public key belonging to a message recipient having a private key corresponding to the public key;
selecting a numerical seed;
using the numerical seed and the public key, generating key recovery information comprising a key recovery vector and an error correcting code, and generating a message key having a third entropy, which is less than the first entropy, wherein: the entropy of the message key is less than the entropy of the numerical seed; and the entropy of the key recovery information is less than the entropy of the numerical seed;
encrypting a message using the message key; and
transmitting the encrypted message and the key recovery information to the message recipient providing a secure transfer of a cryptographic key, whereby the recipient reconstructs the message key using the key recovery information and the private key and decrypts the encrypted message using the reconstructed message key.

* * * * *

UNITED STATES PATENT AND TRADEMARK OFFICE
CERTIFICATE OF CORRECTION

PATENT NO. : 9,264,406 B2
APPLICATION NO. : 14/001541
DATED : February 16, 2016
INVENTOR(S) : Aviad Kipnis et al.

It is certified that error appears in the above-identified patent and that said Letters Patent is hereby corrected as shown below:

Specification

In Col. 8, line 26, delete "Elements wherein each $\beta_3$ is an" and substitute therefor
-- Elements $\beta_1,... \beta_m$, wherein each $\beta_1$ is an --

In Col. 9, line 22, delete " $\text{matrix X: } bj = (\sum_{i=1}{}^m X_{i,j}) \bmod 2^L$ " and substitute therefor
-- $\text{matrix X: } bj = \left(\sum_{i=1}^m x_{i,j}\right) \bmod 2^L$ --

In Col. 9, line 26, delete "The elements are" and substitute therefor -- The elements $X_{i,j}$ are --

In Col. 9, line 40, delete " $MK = (\sum_{j=1}{}^n b_j K_j) \bmod 2^L$ " and substitute therefor
-- $MK = \left(\sum_{j=1}^n b_j K_j\right) \bmod 2^L$ --

In Col. 9, line 47, delete " $KRI_I = \left(\sum_{j=1}{}^n a_{i,j} K_j; 1 \leq i < m\right)$ " and substitute therefor
-- $KRI_I = \left(\sum_{j=1}^n a_{i,j} K_j; 1 \leq i < m\right)$ --

In Col. 9, line 60, delete " $MK = (\sum_{i=1}{}^m Y_i) \bmod 2^L$ " and substitute therefor
-- $MK = \left(\sum_{i=1}^m Y_i\right) \bmod 2^L$ --

Signed and Sealed this
Tenth Day of May, 2016

Michelle K. Lee
*Director of the United States Patent and Trademark Office*

CERTIFICATE OF CORRECTION (continued)
U.S. Pat. No. 9,264,406 B2

Specification

In Col. 11, line 42, delete "$C_i$" and substitute therefor -- $c_i$ --

In Col. 12, line 7, delete " $=\sum_{j=1}^{r} (S_{j,1} \cdot \mu_{j,1} + S_{j,2} \cdot \mu_{j,2} + S_{i,3} \cdot \mu_{i,3})C_{j,i,}$ " and substitute therefor -- $=\sum_{j=1}^{r} (S_{j,1} \cdot \mu_{j,1} + S_{j,2} \cdot \mu_{j,2} + S_{i,3} \cdot \mu_{i,3})C_{j,i,}$ --